United States Patent [19]

Schmidhuber et al.

[11] Patent Number: 4,498,703
[45] Date of Patent: Feb. 12, 1985

[54] SEAT FOR AIRPLANES AND BUSES

[75] Inventors: Karl Schmidhuber, Nürtingen; Helmut Wall, Kirchheim; Vojtech Demovic, Kircheim, all of Fed. Rep. of Germany

[73] Assignee: Keiper Recaro GmbH & Co., Fed. Rep. of Germany

[21] Appl. No.: 381,560

[22] Filed: May 24, 1982

[30] Foreign Application Priority Data

Jun. 4, 1981 [DE] Fed. Rep. of Germany ....... 3122224

[51] Int. Cl.³ .............................................. A47C 1/032
[52] U.S. Cl. .................... 297/328; 248/371; 297/355; 297/313
[58] Field of Search ............... 297/328, 313, 327, 332, 297/354, 355; 248/371, 372.1, 398

[56] References Cited

U.S. PATENT DOCUMENTS 3,384,414  5/1968  Billingham et al. ................ 297/328
3,588,172  6/1971  McGregor ......................... 297/355

FOREIGN PATENT DOCUMENTS

| 675982 | 5/1939 | Fed. Rep. of Germany . |
| 7123759 | 10/1971 | Fed. Rep. of Germany . |
| 2134746 | 1/1973 | Fed. Rep. of Germany . |
| 2306478 | 8/1974 | Fed. Rep. of Germany . |
| 2509026 | 9/1976 | Fed. Rep. of Germany . |
| 2846360 | 5/1980 | Fed. Rep. of Germany ...... 297/300 |
| 2933160 | 2/1981 | Fed. Rep. of Germany . |
| 1113419 | 3/1956 | France ............................... 297/313 |

Primary Examiner—William E. Lyddane
Assistant Examiner—Peter R. Brown
Attorney, Agent, or Firm—Wigman & Cohen

[57] ABSTRACT

The present invention relates to a seat for airplanes, buses and like vehicles. The seat comprises a frame, an upholstery support, and a three-piece device for locking both sides of the upholstery support in a selectable pivot position. The locking device includes a stepless adjustable-length bar in the nature of a hydraulic piston, a body for connecting the front end of the hydraulic piston to a front cross member of the seat frame, and a pivot lever for attaching the rear end of the hydraulic piston to a rear cross member of the upholstery support.

9 Claims, 2 Drawing Figures

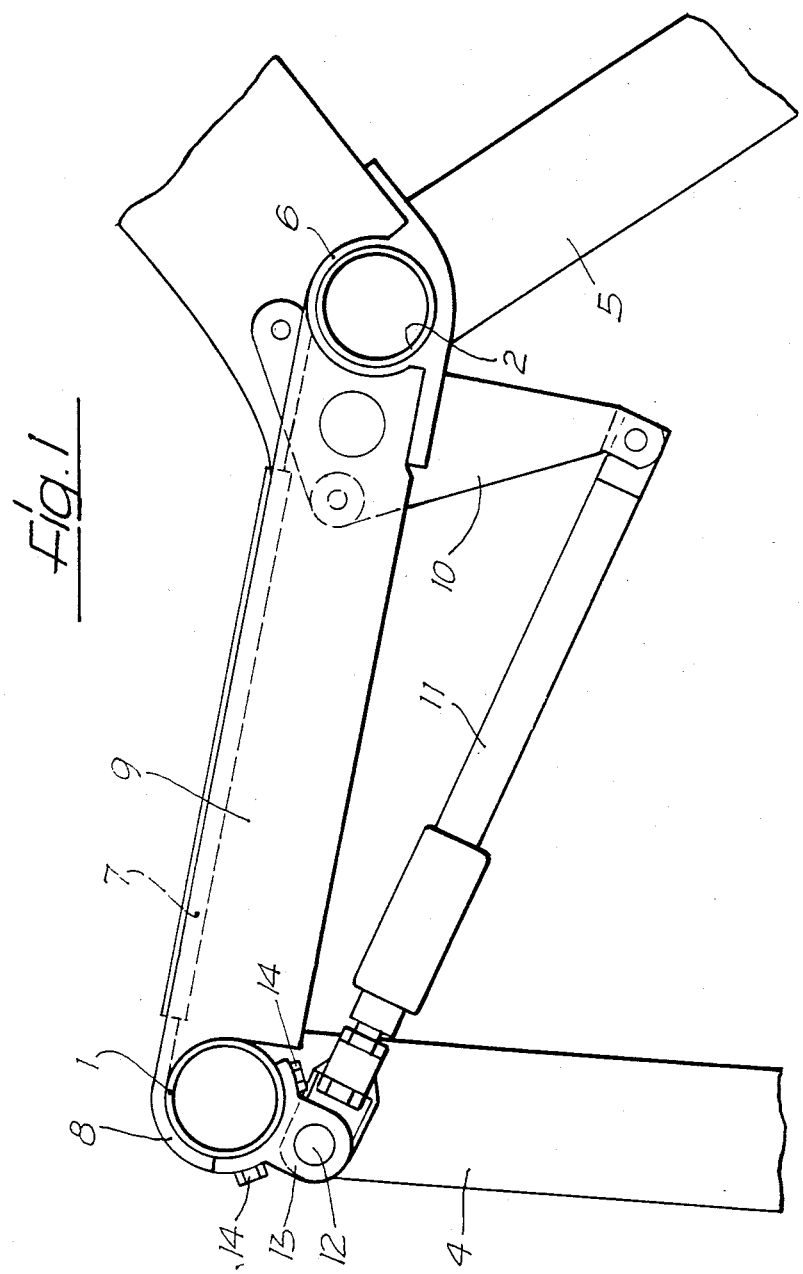

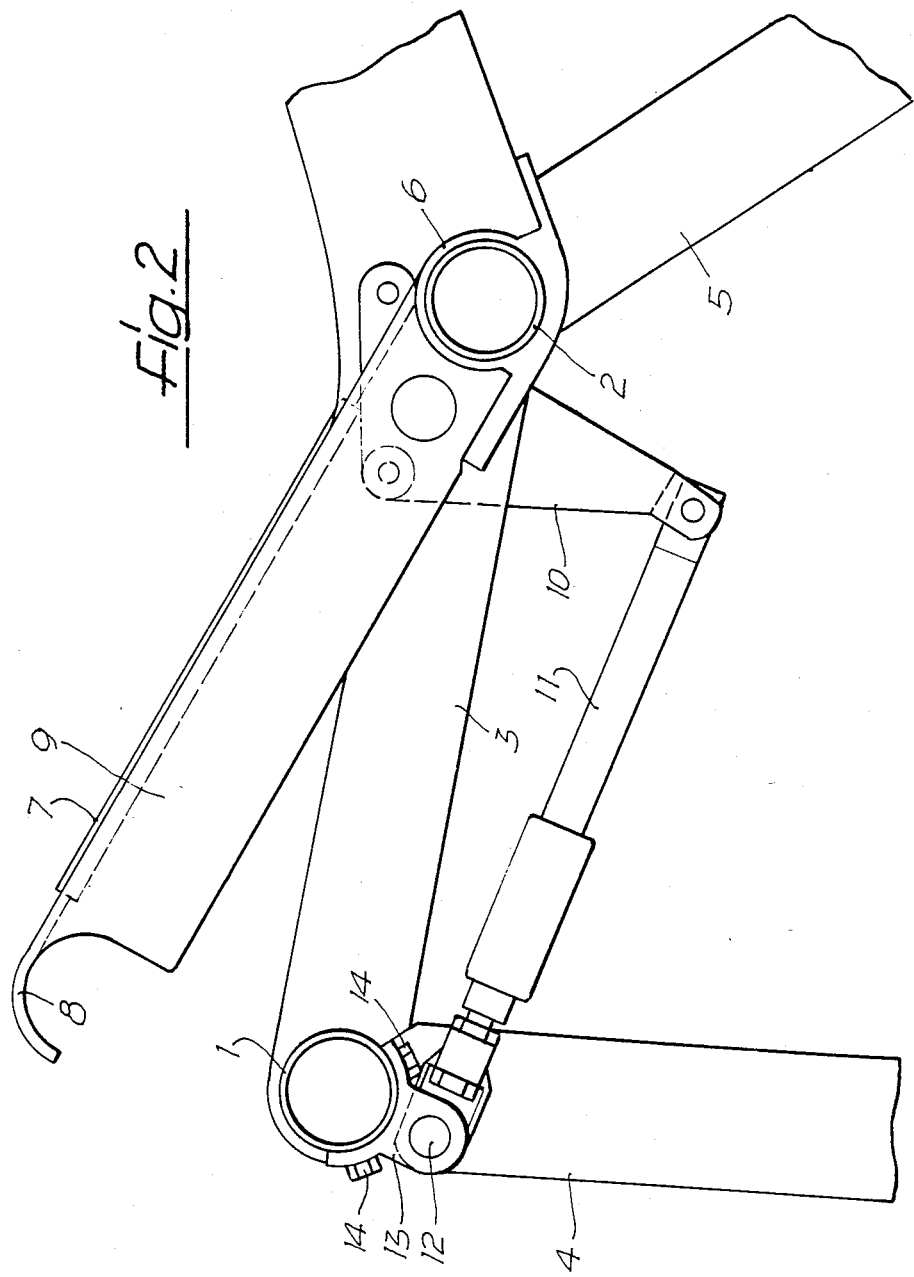

SEAT FOR AIRPLANES AND BUSES

BACKGROUND OF THE INVENTION

1. Field of the Invention

The invention relates to a seat for airplanes and buses, having a seat upholstery support, the rear edge of which is connected with a rear cross member formed by a pipe so as to be pivotable about the longitudinal axis of the pipe. Furthermore, the seat upholstery support can be locked on both sides in selectable angular positions by means of respective adjusting devices.

2. Brief Description of the Prior Art

In known air passenger seats of this type, the seat upholstery support together with the back rest upholstery support can only be locked in the two extreme pivot positions, which is felt to be troublesome in several ways.

OBJECTS AND SUMMARY OF THE INVENTION

It is therefore the object of the invention to create a seat for airplanes and buses, which, without significant added weight or inconvenient additional spatial requirements, allows a stepless adjustment of the inclination angle of the seat upholstery support.

The adjustable-length bar makes it possible to lock the pivot lever and therewith the seat upholstery support in any selectable position within the pivot range by means of a corresponding adjustment of the bar length. Since the weight of both the pivot lever and the adjustable-length bar can be kept low, the increase in the weight of the seat caused by the adjusting devices provided on the respective sides of the seat is minimal. Furthermore, the space required for the adjusting devices is not disruptive, because both the adjustable-length bar and the pivot lever lie beneath the seat frame.

The connection of the pivot lever with a side beam of the seat upholstery support is particularly simple. Therefore, the adjusting device according to the invention can also be subsequently installed as an add-on item in an existing airplane or bus without difficulty.

Particularly advantageous is the effective length of the pivot lever, i.e., the distance between the pivot axis and the point of connection with the adjustable-length bar, being in the range between 100 mm and 140 mm. In this range, the pivot lever does not extend into the foot and storage space beneath the seat. On the other hand, with lever lengths in this range, the unavoidable play in the connection and hinge locations does not result in a noticeable pivot angle of the seat portion and the back rest when in the locked condition.

With regard to requiring the least possible space, it is advantageous for the pivot lever to be formed as a flat bar lying in the pivot plane or as a plate lying in said plane.

The connecting body which connects the forward end of the adjustable-length bar with the seat frame preferably includes a base which can rest against the rear cross member formed by a pipe. The adjustable-length bar is threaded together with this pipe and also includes a sleeve formed in one piece with the base. The sleeve has a bore lying parallel to the pivot axis of the seat upholstery support which encloses a pin of the adjustable-length bar.

In a preferred embodiment, the adjustable-length bar is a known hydraulic device having a remotely operated control valve. The user of the seat then need only open the control valve, for example by activating a button, in order to be able to change the angle of inclination of the seat, and in the desired angular position, he need only close the control valve with push-button operation by releasing the button. This type of hydraulic device is also advantageous with regard to the adjustable-length bar to the extent that the pivot speed and pivot range can be limited thereby in a simple manner.

Of course, the seat according to the invention is not advantageous only when the seat portion pivots together with the back rest, but also when the back rest is pivotable relative to the seat portion and independently thereof.

BRIEF DESCRIPTION OF THE DRAWINGS

The invention is described in greater detail below with the aid of an exemplary embodiment shown in the drawing. Shown are:

FIG. 1 is a partial side view of the exemplary embodiment with minimal inclination of the seat portion; and FIG. 2 is a view corresponding to FIG. 1 with a greater inclination of the seat portion.

DETAILED DESCRIPTION OF THE PREFERRED EMBODIMENT

The airplane passenger seat partially illustrated in FIGS. 1 and 2 includes a seat frame consisting of a front pipe 1 as a forward cross member, a rear pipe 2 as a rear cross member lying parallel to the front pipe 1, and at least two side beams 3, which can be formed by so-called seat dividers and are connected at one end with the front pipe 1 and at the other end with the rear pipe 2. This seat frame is supported by front legs 4 and rear legs 5, the upper ends of which are rigidly connected with the seat frame.

Rotatably mounted on the rear pipe 2 is a rear cross beam 6 of an upholstery support which includes a flat upholstery member 7 which stretches across a frame formed by the rear cross beam 6, a front cross beam 8, and two longitudinal beams 9. The two longitudinal beams 9 and the front cross beam 8 overlap the side beams 3 and the front pipe 1 when the seat upholstery support is in the position illustrated in FIG. 1, which represents the position of least inclination. In this position the front cross beam 8 can also rest on the front pipe 1.

As a result of the pivotable mounting of the rear cross beam 6 on the rear pipe 2, the seat upholstery support can be pivoted from the rotational position shown in FIG. 1, into positions in which its rearward inclination angle is greater, i.e., where the front cross beam 8 is located at a distance above the front pipe 1. In order to be able to lock the seat upholstery support in any desired angle of inclination within the pivot range, respective pivot levers 10 are connected to the two longitudinal beams 9 of the seat upholstery support. The two identical pivot levers 10 extend downward within the frame of the seat upholstery support and the seat frame. They have the shape of a flat rail or plate and lie in the pivot plane.

Near the lower end of each pivot lever 10, there is arranged thereon a rod-like hydraulic device 11 having a stepless variable length and lying with its longitudinal axis perpendicular to the longitudinal axis of the rear pipe 2. The other end of this hydraulic device 11, which serves as the locking device, supports a pin 12, which lies perpendicular to the longitudinal axis of this hydraulic device 11 and is rotatably mounted in the bore of a connecting body 13. The longitudinal axis of this bore in body 13 runs parallel to the longitudinal axis of the rear pipe 2. As shown, for example, in FIG. 1, the connecting body 13 consists of a sleeve and a half-shell shaped base formed in one piece therewith. The base lies against the underside of the front pipe 1 and is rigidly connected with the latter by means of fasteners such as screws 14.

The hydraulic device 11, which is a known constructional element, includes a control valve which is connected via a hose line with an activating element (not shown), such as a button. When the seat user presses this button, the length of the hydraulic device 11 changes smoothly. This means that the seat user can change the angle of inclination of the seat upholstery support and at the same time smoothly change the angle of inclination of the seat portion within the pivot range. When the button or other activating element is released, the control valve closes and locks the length of the hydraulic device 11, so that no hydraulic fluid can then flow from one operating chamber to the other in the interior of the hydraulic device 11.

The foregoing preferred embodiment is considered as illustrative only. Numerous other modifications and changes will readily occur to those skilled in the pertinent art. What we claim is:

1. A seat for airplanes, buses, and the like, comprising:
    a seat frame having a front cross member, side beams, and a rear cross member formed by a rear pipe with a longitudinal axis therethrough;
    a seat upholstery support connected near its rear edge with the rear cross member of the seat frame, said seat upholstery support being pivotable about the longitudinal axis of the rear pipe;
    means for locking both sides of the seat upholstery support in a selectable pivot position;
    a stepless adjustable-length bar forming a part of the locking means and being arranged beneath one of the side beams of the seat frame, said stepless adjustable-length bar further having a front end and a rear end;
    a connecting body forming another part of the locking means and being arranged beneath the front cross member of the seat frame, said connecting body further being rigidly connected to the seat frame and also being attached to the front end of the stepless adjustable-length bar; and
    a pivot lever forming a third part of the locking means, having its one end attached to the rear end of the stepless adjustable-length bar and having its other end attached to the seat upholstery support near the longitudinal axis of the rear pipe.

2. The seat according to claim 1, wherein:
said seat upholstery support including a longitudinal side beam; and
said pivot lever having its other end attached to the seat upholstery support at the longitudinal side beam.

3. The seat according to claim 1, wherein:
said pivot lever has an effective length from its one end to its other end between 100 and 140 millimeters.

4. The seat according to claim 2, wherein:
said pivot lever is a flat bar lying in a pivot plane formed by one of the side beams of the seat frame and the longitudinal side beam of the seat upholstery support.

5. The seat according to claim 2, wherein:
said pivot lever is a plate lying in a pivot plane formed by one of the side beams of the seat frame and the longitudinal side beam of the seat upholstery support.

6. The seat according to claim 1, wherein:
said connecting body includes a base portion threaded to and abutted against the front cross member of the seat frame and also includes a sleeve portion formed integrally in one piece with the base portion.

7. The seat according to claim 1, wherein:
said connecting body has a bore therethrough with its longitudinal axis lying parallel to the pivot axis through the longitudinal axis of the rear pipe of the seat frame.

8. The seat according to claim 7, wherein:
said stepless adjustable-length bar includes a pin member arranged in the bore of the connecting body.

9. The seat according to claim 1, wherein:
said stepless adjustable-length bar is a hydraulic device having a remotely operated control valve.

* * * * *